(12) United States Patent
Mori (10) Patent No.: US 11,496,070 B2
(45) Date of Patent: Nov. 8, 2022

(54) DRIVING APPARATUS THAT DRIVES PAN HEAD APPARATUS, CONTROL METHOD THEREFOR, VIBRATION-WAVE MOTOR APPARATUS, AND IMAGE PICKUP APPARATUS

(71) Applicant: CANON KABUSHIKI KAISHA, Tokyo (JP)

(72) Inventor: Takao Mori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1341 days.

(21) Appl. No.: 15/850,554

(22) Filed: Dec. 21, 2017

(65) Prior Publication Data

US 2018/0183358 A1   Jun. 28, 2018

(30) Foreign Application Priority Data

Dec. 27, 2016   (JP) .............................. JP2016-253179
Dec. 6, 2017   (JP) .............................. JP2017-234460

(51) Int. Cl.
| | |
|---|---|
| *H02N 2/14* | (2006.01) |
| *G02B 7/02* | (2021.01) |
| *H02K 11/33* | (2016.01) |
| *H04N 5/232* | (2006.01) |
| *H02N 2/16* | (2006.01) |
| *H02N 2/10* | (2006.01) |

(52) U.S. Cl.
CPC ............... *H02N 2/147* (2013.01); *G02B 7/02* (2013.01); *H02K 11/33* (2016.01); *H02N 2/142* (2013.01); *H04N 5/232122* (2018.08); *H02N 2/108* (2013.01); *H02N 2/163* (2013.01); *H04N 5/23299* (2018.08)

(58) Field of Classification Search
CPC .................................. H02N 2/147; G02B 7/02
See application file for complete search history.

(56) References Cited

U.S. PATENT DOCUMENTS

| | | |
|---|---|---|
| 5,198,714 A | 3/1993 | Salomon |
| 2002/0121869 A1* | 9/2002 | Kataoka ................... H02N 2/14 |
| | | 318/114 |

(Continued)

FOREIGN PATENT DOCUMENTS

| | | |
|---|---|---|
| JP | H0479775 A | 3/1992 |
| JP | H04505845 A | 10/1992 |
| JP | 2005037724 A | 2/2005 |

OTHER PUBLICATIONS

Office Action issued in Japanese Appln. No. 2017-234460 dated Jul. 20, 2021.

*Primary Examiner* — Bryan P Gordon
(74) *Attorney, Agent, or Firm* — Rossi, Kimms & McDowell LLP (57) ABSTRACT

The driving apparatus comprises a vibrating body which includes an electro-mechanical energy conversion device, and drives a vibration-wave motor which moves the vibrating body and a driven body relatively to each other. The electro-mechanical energy conversion device has sensor electrodes that output detecting signals corresponding to vibrations of the vibrating body. Based on the detecting signals, the driving apparatus determines a direction in which the vibrating body and the driven body are to be moved relatively to each other.

10 Claims, 9 Drawing Sheets

(56) References Cited

U.S. PATENT DOCUMENTS

| | | | |
|---|---|---|---|
| 2008/0124128 A1* | 5/2008 | Muto | G03G 15/0131 399/167 |
| 2012/0087023 A1* | 4/2012 | Ashizawa | H02N 2/06 310/317 |
| 2012/0096941 A1* | 4/2012 | Yoneda | G01C 19/5656 73/504.12 |
| 2014/0148951 A1* | 5/2014 | Saen | B25J 13/083 901/34 |
| 2015/0180373 A1* | 6/2015 | Atsuta | H02N 2/001 318/116 |
| 2017/0017137 A1* | 1/2017 | Morita | G03B 3/10 |
| 2017/0168314 A1* | 6/2017 | Chan | G02B 27/646 |

* cited by examiner

DRIVING APPARATUS THAT DRIVES PAN HEAD APPARATUS, CONTROL METHOD THEREFOR, VIBRATION-WAVE MOTOR APPARATUS, AND IMAGE PICKUP APPARATUS

BACKGROUND OF THE INVENTION

Field of the Invention

The present invention relates to a driving apparatus, a control method therefor, a vibration-wave motor apparatus, and an image pickup apparatus, and in particular, a driving apparatus that drives a pan head apparatus on which a surveillance camera, a network camera, or the like is mounted.

Description of the Related Art

In general, a vibration-wave motor (also referred to as an ultrasonic motor) runs at a low speed and with a high torque, and hence in many cases, it is used for electronic equipment that is directly driven without using a reduction gear. In recent years, it has been proposed that the vibration-wave motor is used as a driving source for a pan head apparatus that freely controls a direction of an optical axis in an image pickup apparatus which is an example of the electronic equipment. This aims at making rotary motion of the pan head apparatus more sophisticated with direct drive by taking advantage of the characteristics that the vibration-wave motor runs at a low speed and with a high torque. Furthermore, the vibration-wave motor has frictional holding power when it is not energized, and it does not have to be additionally equipped with a holding power generating system such as a brake, which makes the vibration-wave motor compact.

It has also been proposed that the vibration-wave motor is installed in other rotary equipment by taking advantage of the above described characteristics of the vibration-wave motor. For example, the vibration-wave motor is used to open and close a door mirror (see Japanese Laid-Open Patent Publication (Kokai) No. H04-79775). The Japanese Laid-Open Patent Publication (Kokai) No. H04-79775 describes a detecting unit that detects occurrence of a disturbance caused by an output side of the vibration-wave motor when the vibration-wave motor is held by holding power when it is not energized.

Specifically, when a slip occurs on a frictional contact surface of the vibration-wave motor due to the disturbance, the detecting unit detects a self-excited vibration excited with this slip. The result of the detection by the detecting unit is then sent to a control unit, which in turn requests a driving signal generating unit to output a driving signal so that the vibration-wave motor can be immediately driven to prevent wear of the frictional contact surface and generation of unpleasant noise.

It should be noted that according to Japanese Laid-Open Patent Publication (Kokai) No. H04-79775, a direction in which the vibration-wave motor is run in a restoring operation after occurrence of a slip is determined in advance.

In a camera for which a usage environment and a way to use vary from one user to another such as a surveillance camera or a network camera, it is unknown which rotational direction a disturbance acts on which shaft. It is thus difficult to avoid wear of the frictional contact surface through an operation of the vibration-wave motor determined in advance. On the other hand, when it is only necessary to prevent wear, it is possible to use a known system which reduces frictional force of the frictional contact surface by additionally exciting a standing wave.

However, if the system which reduces the frictional force is used, a position of a device group mounted on the driven body side of the pan head apparatus would change abruptly under the influence of gravity when the vibration-wave motor is released from the state of being held by friction.

SUMMARY OF THE INVENTION

The present invention provides a driving apparatus which is able to prevent wear of a frictional contact surface when a vibration-wave motor is used, and also reduce variations in the position of the vibration-wave motor when it is released from a state of being held by friction, a control method therefor, the vibration-wave motor apparatus, and an image pickup apparatus.

Accordingly, the present invention provides a driving apparatus that has a vibrating body having an electro-mechanical energy conversion device and drives a vibration-wave motor that moves the vibrating body and a driven body relatively to each other, wherein the electro-mechanical energy conversion device comprises sensor electrodes that output detecting signals corresponding to vibrations of the vibrating body, and wherein the driving apparatus comprises a determination unit configured to determine, based on the detecting signals, a direction in which the vibrating body and the driven body are to be moved relatively to each other.

According to the present invention, when the vibration-wave motor is used, wear of the frictional contact surface is prevented, and also variations in the position of the vibration-wave motor are reduced when it is released from a state of being held by friction.

Further features of the present invention will become apparent from the following description of exemplary embodiments (with reference to the attached drawings).

DESCRIPTION OF THE EMBODIMENTS

Examples of driving apparatuses according to embodiments of the present invention will now be described in detail below with reference to the drawings. It should be noted that the driving apparatuses described hereafter drive a pan head apparatus on which a surveillance camera, a network camera, or the like is mounted.

First Embodiment

Figure 1A:
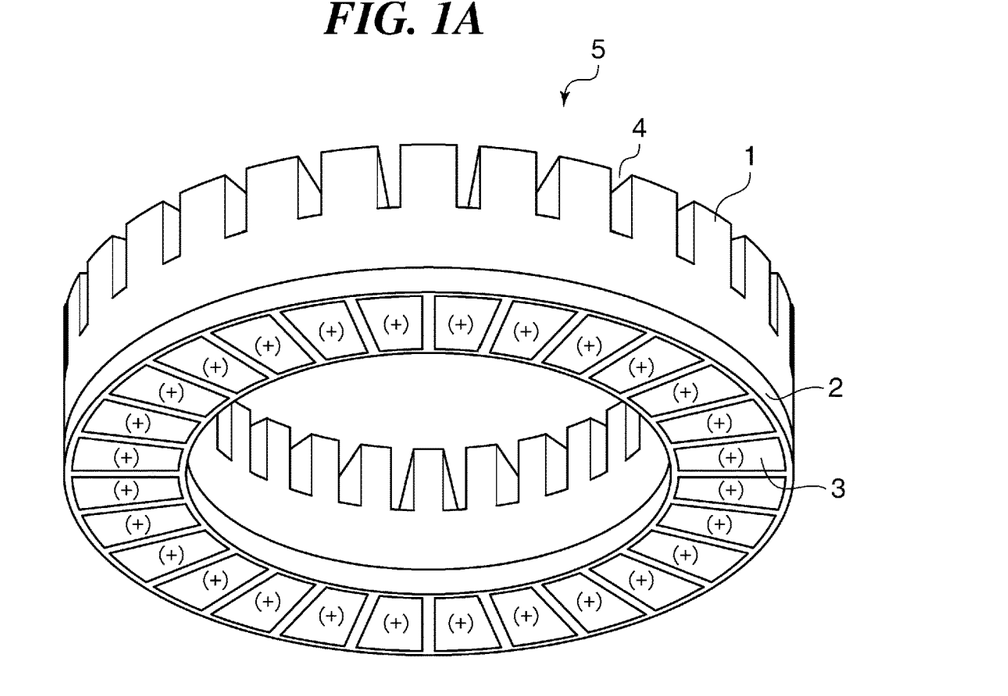
FIGS. 1A and 1B are views showing a vibrating body and a vibration-wave motor, which uses the vibrating body, for use in a driving apparatus according to a first embodiment of the present invention.

FIG. 1A is a perspective view showing a vibrating body of a vibration-wave motor for use in a driving apparatus according to a first embodiment of the present invention.

The vibrating body 5 in FIG. 1A has a metallic elastic body 1 with an annular shape, and a piezoelectric element 2 which is an electro-mechanical energy conversion element. Groove portions 4 are radially formed on one side of the elastic body 1 so as to increase the amount of displacement in a circumferential direction caused by a bending vibration. The piezoelectric element 2 is fixed to the other side of the elastic body 1, which is opposite to the side on which the groove portions 4 are formed, by bonding or the like.

Figure 1B:
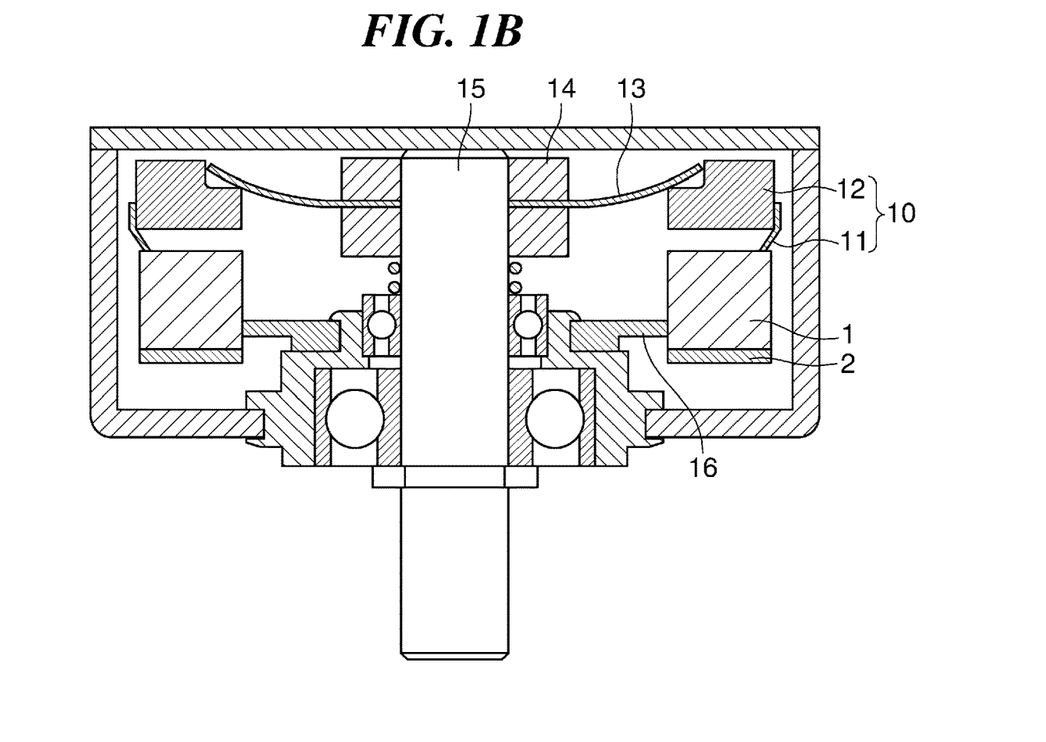

FIG. 1B is a cross-sectional view showing an overall arrangement of the vibration-wave motor.

A driven body 10 has a cylindrical contact body 11 and a mass unit 12. The driven body 10 is pressed against the elastic body 1 of the vibrating body 5 through application of pressure by a pressure spring 13, and this pressure brings the driven body 10 and the vibrating body 5 into pressure contact with each other. Frictional force generated on a contact surface between the driven body 10 and the vibrating body 5 (hereafter referred to as "the frictional contact surface") acts as driving force to drive the driven body 10, and rotational torque of the driven body 10 is transmitted to a shaft 15 via the pressure spring 13 and a disk 14. It should be noted that the vibrating body 5 is provided with a thin plate-shaped supporting member 6 which supports the vibrating body 5.

Figure 2A:
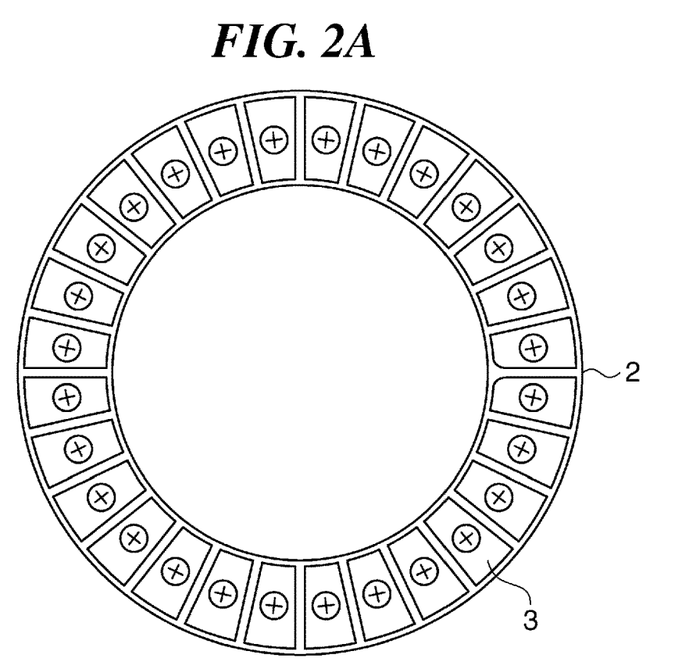
FIGS. 2A and 2B are views useful in explaining electrode patterns on a piezoelectric element appearing in FIGS. 1A and 1B and their polarizing directions.
Figure 2B:
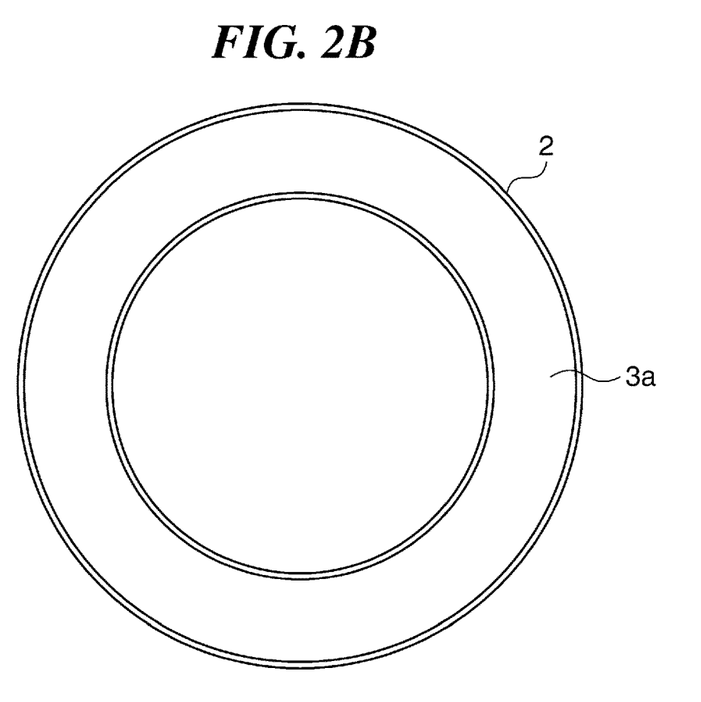

FIGS. 2A and 2B are views useful in explaining electrode patterns on the piezoelectric element 2 appearing in FIGS. 1A and 1B and their polarizing directions. FIG. 2A shows a pattern electrode surface, and FIG. 2B shows a common electrode surface located on a back side of the electrode surface.

Referring to FIGS. 1A and 2B, the common electrode surface in FIG. 2B is firmly fixed to the elastic body 1, and a common electrode 3a is brought into electric continuity with the elastic body 1. On the other hand, pattern electrodes 3 are radially formed on the pattern electrode surface appearing in FIG. 2A. The pattern electrodes 3 are comprised of 28 electrodes each of which has a width corresponding to one quarter of one wavelength ($\lambda$) of driving vibration. Namely, the vibrating body 5 uses, in its driving vibration mode, seventh-order bending vibrations having seven peaks per turn.

In this driving vibration mode, when the piezoelectric element 2 contracts in a thickness direction, it expands in a direction perpendicular to the thickness direction. On the other hand, when the piezoelectric element 2 expands in the thickness direction, it contracts in the direction perpendicular to the thickness direction. Over the length of one wavelength ($\lambda$), the piezoelectric element 2 forms, in a circumferential direction, an expansion of one-quarter wavelength ($\lambda/4$) and a contraction of one-quarter wavelength ($\lambda/4$) at the same time in a positional phase of half wavelength ($\lambda/2$) to form a standing wave.

Referring to FIG. 2A, the pattern electrodes 3 are formed with one-quarter wavelength ($\lambda/4$) pitches over the entire circumference, and all polarizing directions of the pattern electrodes 3 are the same as indicated by "+" in FIG. 2A. Thus, by applying AC voltages in inverted phases to two electrodes which are half wavelength ($\lambda/2$) out of phase with each other, a standing wave with a frequency of the AC voltages is generated. On this occasion, when the pattern electrodes 3 to which AC voltages in the same phase are applied are, for example, electrodes for producing a standing wave A, they are referred to as an A+ phase and an A− phase, respectively.

An ordinary vibration-wave motor of a progressive wave type generates a progressive wave by exciting two standing waves, which have peaks one-quarter wavelength ($\lambda/4$) out of phase with each other, with a phase difference of 90 degrees in terms of time. Assuming that these two standing waves are referred to as a standing wave A and a standing wave B, a progressive wave is generated in a total of four phases consisting of the A+ phase, the A− phase, a B+ phase, and a B− phase.

Figure 3:
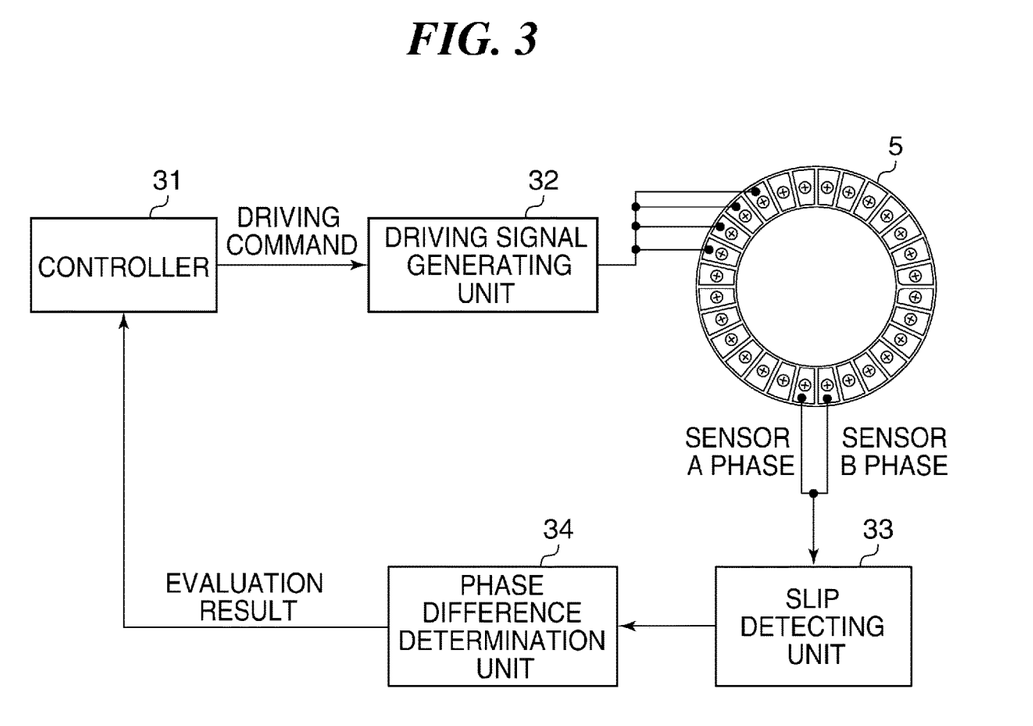
FIG. 3 is a diagram useful in explaining an example of the driving apparatus according to the first embodiment of the present invention.

FIG. 3 is a view useful in explaining an example of the driving apparatus according to the first embodiment of the present invention.

When a disturbance acts on an output shaft of the vibration-wave motor, the driving apparatus shown in FIG. 3 reduces wear of the frictional contact surface by instantaneously detecting a slip occurring on the frictional contact surface (pressure contact surface) and reducing the slip.

The driving apparatus has a controller 31, a driving signal generating unit 32, a slip detecting unit 33, and a phase difference determination unit 34. The controller 31 drivingly controls the vibrating body 5 (that is, the vibration-wave motor) by outputting driving conditions such as the rpm, driving amount, and driving direction of the vibration-wave motor as driving commands. The driving signal generating unit 32 generates driving signals, which are to be applied to the vibrating body 5 of the vibration-wave motor, based on the driving commands.

Sensor phases convert a mechanical distortion, which occurs in the piezoelectric element 2 in response to a vibration generated in the elastic body 1 due to a disturbance, into an electric signal through a piezoelectric effect and outputs the electric signal. In the example shown in the figure, it is assumed that two of the 28 pattern electrodes 3 are a sensor A phase (first sensor electrode) and a sensor B phase (second sensor electrode), respectively. On the other hand, the remaining 26 pattern electrodes 3 are used as driving electrodes to which 4-phase driving signals are input via an FPC substrate (not shown) so as to produce driving vibrations.

The slip detecting unit 33 receives output signals from the sensor A phase and the sensor B phase and sends the output signals as first and second detecting signals, respectively, to the phase difference determination unit 34. It should be noted that when the vibration-wave motor is at a standstill, the slip detecting unit 33 stands by in a state of readiness to monitor output signals from the sensor A phase and the sensor B phase all the time. When a disturbance occurs to cause a minute slip on the frictional contact surface, the slip detecting unit 33 catches output signals with minute amplitudes to detect the occurrence of the slip. With the occurrence of the slip, the slip detecting unit 33 sends the output signals from the sensor A phase and the sensor B phase as first and second detecting signals, respectively, to the phase difference determination unit 34.

The phase difference determination unit 34 compares the first and second detecting signals with each other and detects a phase relationship (that is, a phase difference) between the first and second detecting signals. Based on the detected phase difference, the phase difference determination unit 34 then determines a direction of rotation (that is, a slip direction) of the vibration-wave motor caused by a disturbance. After that, the phase difference determination unit 34 sends an evaluation result (determination result) indicating the slip direction to the controller 31. Based on the slip direction, the controller 31 sends a slip driving command for driving the vibration-wave motor in the same direction as the slip direction to the driving signal generating unit 32 to reduce the slip of the vibration-wave motor.

Reducing the slip of the vibration-wave motor in the manner described above reduces wear of the friction contact surface.

A description will now be given of how the phase difference determination unit 34 in FIG. 3 determines the slip direction.

Figure 4A:
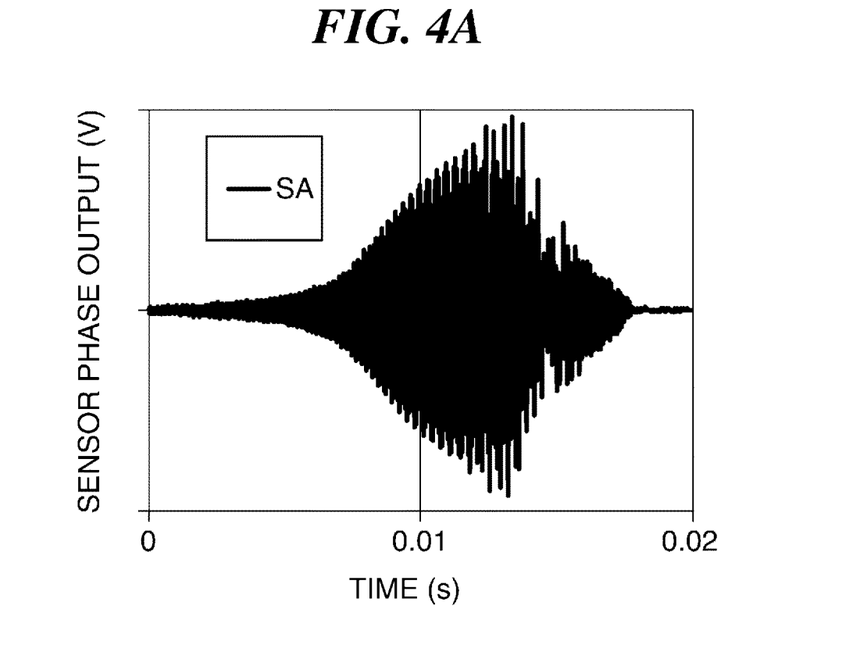
FIGS. 4A and 4B are diagrams useful in explaining examples of output signals from sensor phases when a slip is caused to occur by forcing an output shaft of the vibration-wave motor to rotate in a CW direction.
Figure 4B:
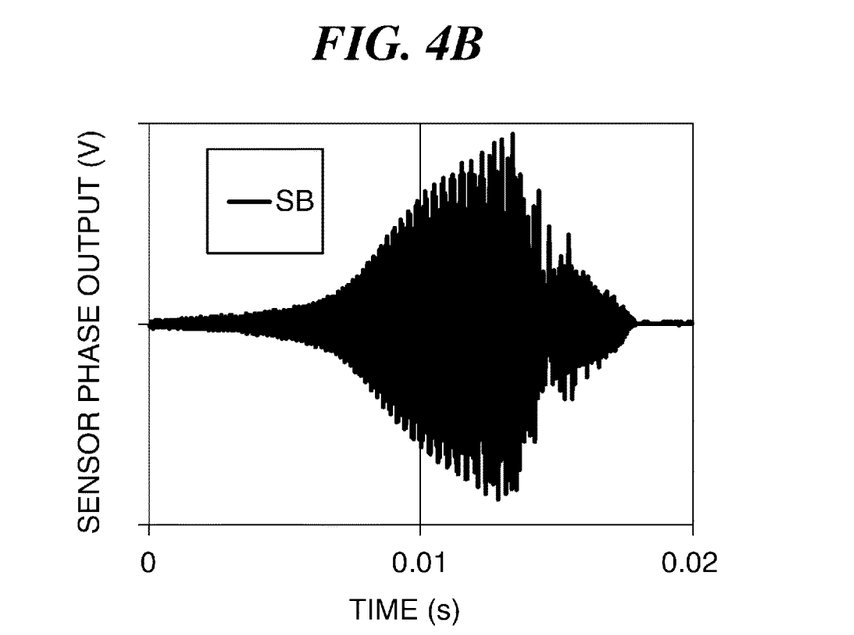

FIGS. 4A and 4B are views useful in explaining examples of output signals from the sensor phases when a slip is caused to occur by forcing the output shaft of the vibration-wave motor to rotate in a CW direction. FIG. 4A shows output signals from the sensor A phase, and FIG. 4B shows output signals from the sensor B phase. It should be noted that here, the output signals are measured by an oscilloscope, and the CW direction means a clockwise direction as seen from a surface on which the grooves 4 in FIG. 1A are formed (the groove formed surface).

In FIGS. 4A and 4B, the horizontal axis represents time, and the vertical axis represents voltage values. The output signals from both the sensor A phase (SA) and the sensor B phase (SB) vary during a period from immediately after the occurrence of the slip (0 second) to an end of the slip (0.02 second). As is apparent from FIGS. 4A and 4B, the output signals from both the sensor A phase and the sensor B phase have substantially the same waveforms. At the beginning of the slip, the output signals have relatively small amplitudes, the amplitudes start abruptly increasing at about 0.008 second, and the slip comes to an end after about 0.01 second.

Figure 5A:
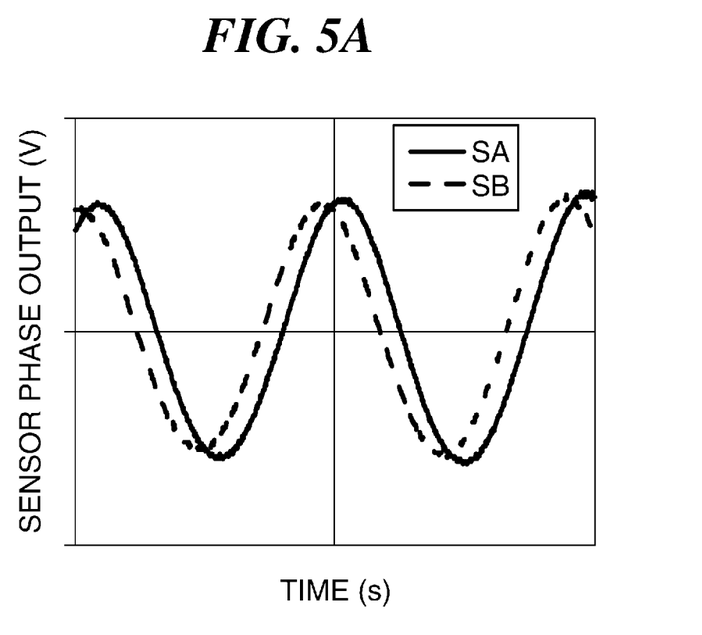
FIGS. 5A and 5B are diagrams useful in explaining examples of output signals from the sensor A phase and the sensor B phase immediately after a slip is caused to occur by forcing the output shaft of the vibration-wave motor to rotate.
Figure 5B:
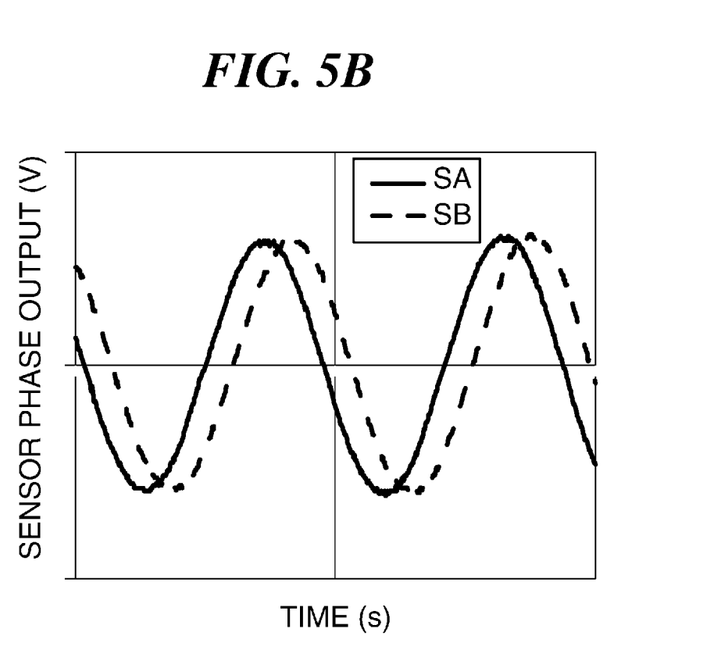

FIGS. 5A and 5B are views useful in explaining examples of output signals from the sensor phases immediately after a slip is caused to occur by forcing the output shaft of the vibration-wave motor to rotate. FIG. 5A shows the output signals which are output when the output shaft of the vibration-wave motor is forced to rotate in the CW direction, and FIG. 5B shows the output signals which are output when the output shaft of the vibration-wave motor is forced to rotate in a CCW direction. It should be noted that the CCW direction means a counterclockwise direction as seen from the groove formed surface shown in FIGS. 1A and 1B.

When the output shaft of the vibration-wave motor is forced to rotate in the CW direction, a phase of the output signal in the sensor A phase (SA) lags behind a phase of the output signal in the sensor B phase (SB). On the other hand, when the output shaft of the vibration-wave motor is forced to rotate in the CCW direction, a phase of the output signal in the sensor A phase (SA) is ahead of a phase of the output signal in the sensor B phase (SB). Namely, merely by detecting a phase difference between the output signals in the sensor A phase and the sensor B phase at the beginning of the slip, the slip direction (rotational direction) immediately after the occurrence of the slip is determined.

A description will now be given of a mechanism that causes a phase difference between the output signals in the sensor A phase and the sensor B phase according to the rotational direction (that is, relative moving direction) of the driven body 10.

When a force that forces the shaft 15, which is the output shaft of the vibration-wave motor, to rotate acts externally to cause a slip on the frictional contact surface between the driven body 10 and the vibrating body 5, a progressive wave is generated in a circumferential direction of the vibrating body 5 in a direction opposite to a direction in which the driven body 10 is forced to rotate so that frictional force can be weakened. On this occasion, a distortion occurs in the piezoelectric element due to peaks and valleys of the progressive wave, and hence sinusoidal output signals are output from the sensor A phase and the sensor B phase due to a piezoelectric effect.

Since the progressive wave is transmitted in the circumferential direction of the vibrating body 5 as described earlier, the peaks of the progressive wave pass over the sensor electrodes, which are arranged with spaces left in the transmitting direction, with a time lag. This develops a phase difference between the output signals from the sensor A phase and the sensor B phase according to the rotational direction of the driven body 10.

Figure 6:
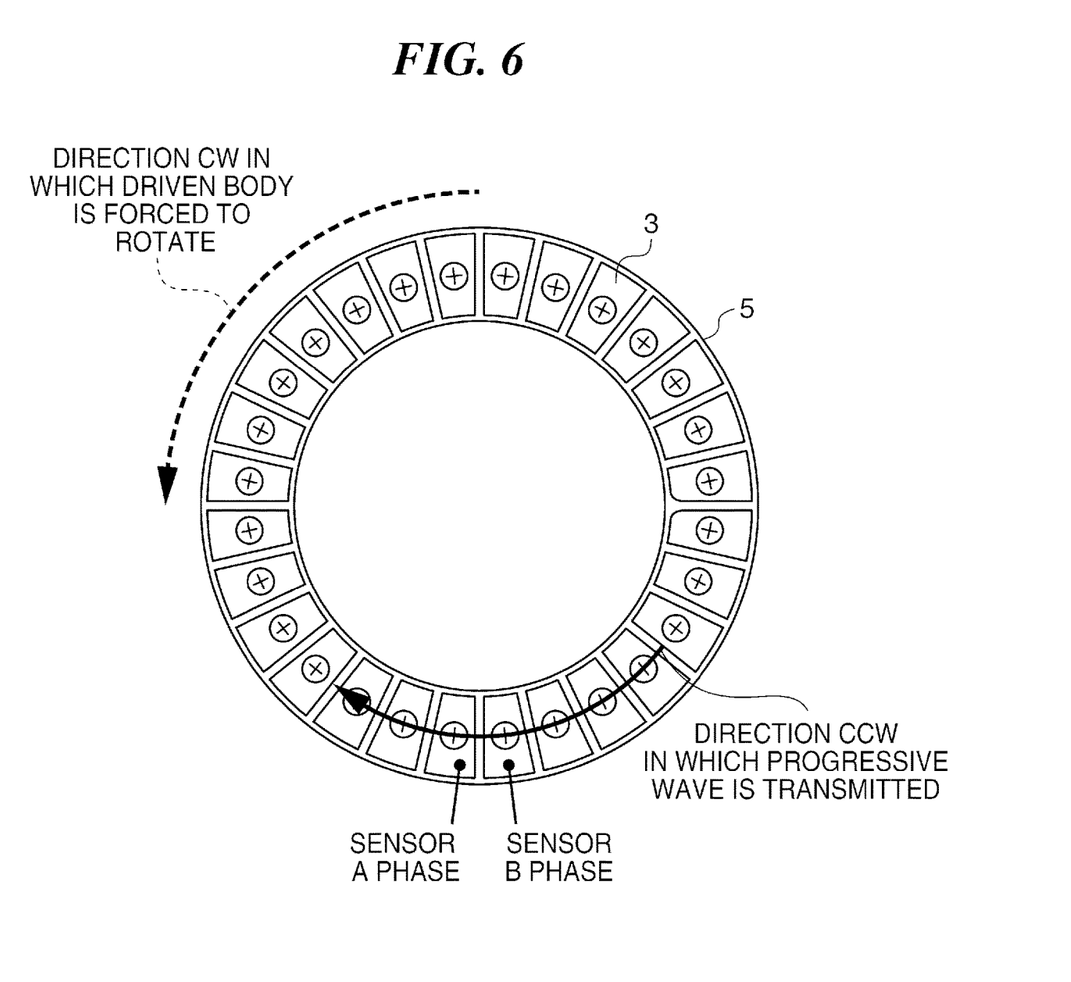
FIG. 6 is a view useful in concretely explaining a mechanism for developing a phase difference between the output signals from the sensor A phase and the sensor B phase according to a rotational direction of the driven body.

FIG. 6 is a view useful in concretely explaining a mechanism for developing a phase difference between the output signals from the sensor A phase and the sensor B phase according to the rotational direction of the driven body 10.

When the driven body 10 is forced to rotate in the CW direction indicated by a broken-line arrow, a progressive wave in the CCW direction indicated by a solid-line arrow is generated in the vibrating body 5. The same progressive wave is generated in the piezoelectric element 2 constituting the vibrating body 5, and hence peaks of the progressive wave pass the sensor A phase and the sensor B phase on the pattern electrode surface 3 with a time lag.

As a result, as described earlier with reference to FIG. 5A, a phase of the output signal from the sensor A phase lags behind a phase of the output signal from the sensor B phase. Likewise, when the driven body 10 is forced to rotate in the CCW direction, the progressive wave is transmitted in the opposite direction, and hence as described earlier with reference to FIG. 5B, a phase of the output signal from the sensor A phase is ahead of a phase of the output signal from the sensor B phase. Therefore, if a plurality of sensor phases is provided by arranging sensor electrodes at locations over which peaks of the progressive wave pass with time lags, it is possible to detect a phase difference.

As described earlier, it is preferred that the two pattern electrodes 3 located close to each other in the rotational direction (relatively moving direction) of the driven body 10 are used as the sensor electrodes, but the sensor electrodes should not necessarily be located next to each other. Further, it is preferred that the plurality of sensor electrodes has the same shape. Namely, the amplitude levels of two output signals output from the sensor phases are equal as long as mechanical distortions occurring due to the progressive wave are equal, and therefore, it is preferred that the plurality of sensor electrodes have the same shape. When one of two output signals under comparison has a low amplitude level, the accuracy in determining a phase difference may deteriorate, and further, the timing with which the start of a slip is detected may be delayed.

Further, it is preferred that the area and layout of the plurality of sensor electrodes are designed so that the amplitude levels of output signals can be equal with consideration given to a vibration mode of a progressive wave generated due to occurrence of a slip. Moreover, even when one sensor phase is comprised of an electrode group consisting of a plurality of electrodes, it is possible to detect a phase difference in the same manner. In this case, however, it is difficult to predict phases of output signals from the electrode group, and therefore, a phase relationship between output signals from the electrode group due to a difference in a rotational direction needs to be empirically grasped in advance to construct the driving apparatus.

It should be noted that when the vibrating body 5 is driven by the driving apparatus as well, it is possible to determine the rotational direction of the vibrating body 5 (that is, the vibration-wave motor) in the same manner.

Further, the driving apparatus shown in the figures may be used as an electric assist for manual driving. For example, when a force that causes the frictional contact surface to slip is applied from the shaft 15 side of the vibration-wave motor, the slip detecting unit 33 detects a minute slip. Then, the phase difference determination unit 34 determines a direction in which the vibration-wave motor is to be manually rotated, and to assist the manual driving, the controller 31 sends a command signal to the driving signal generating unit 32.

Thus, in the first embodiment of the present invention, when a slip occurs on the frictional contact surface of the vibration-wave motor due to a disturbance or the like, a rotational direction of the slip is detected, and the vibration-wave motor is driven in the same direction of the rotational direction of the slip. This reduces wear of the vibration-wave motor resulting from a disturbance or the like.

Second Embodiment

Next, a description will be given of an example of a driving apparatus according to a second embodiment of the present invention.

Figure 7:
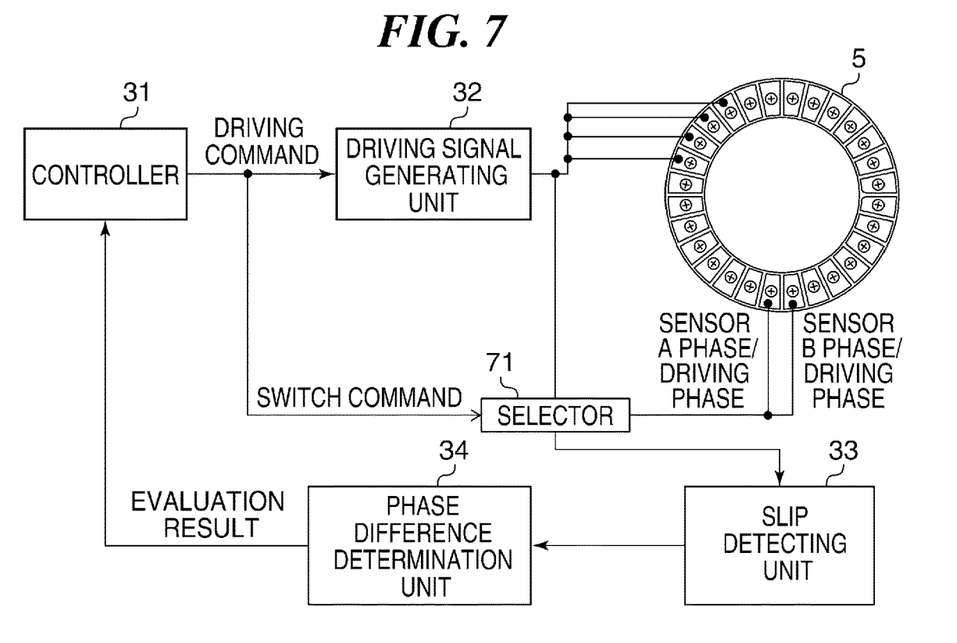
FIG. 7 is a diagram useful in explaining an example of a driving apparatus according to a second embodiment of the present invention.

FIG. 7 is a view useful in explaining the example of the driving apparatus according to the second embodiment of the present invention. It should be noted that in FIG. 7, the same component element as those appearing in FIG. 3 are denoted by the same reference numerals.

In the driving apparatus shown in FIG. 7 as well, wear of the frictional contact surface caused by a disturbance or the like is reduced as with the driving apparatus shown in FIG. 3. In the driving apparatus shown in FIG. 7, electrodes used as sensor phases are used as driving phases as well as will be described later.

As shown in the figure, a selector 71 is placed between a sensor A phase/driving phase and a sensor B phase/driving phase and the slip detecting unit 33. The selector 71 has a selector switch, and as will be described later, switches the sensor phases to the driving phases.

The selector 71 is connected to the controller 31 and the driving signal generating unit 32. When the selector 71 connects the selector switch to an input side based on a switch command from the controller 31, the driving signal generating unit 32 and the sensor A phase and the sensor B phase are connected to each other. As a result, driving signals are input from the driving signal generating unit 32 to the sensor A phase and the sensor B phase, which in turn act as the driving phases.

On the other hand, when the selector 71 connects the selector switch to an output side based on the switch command, the slip detecting unit 33 and the sensor A phase and the sensor B phase are connected to each other, which brings the driving apparatus into the same state as that described above with reference to FIG. 3.

Thus, in the second embodiment of the present invention, the sensor phases (sensor electrodes) that do not contribute to generation of vibrations can selectively be used as the driving electrodes for driving as well, and as a result, performance of the vibration-wave motor is improved.

While the vibration-wave motor is running, the sensor phases that are not used to drive the vibration-wave motor cause irregularities in progressive waves in driving vibrations, and this is a factor that causes wear of the frictional contact surface. Thus, as described above, to drive the vibration-wave motor, irregularities in the progressive waves are reduced to extend the life of the vibration-wave motor by using the entire surface of the piezoelectric element 2 as the driving phase by means of the selector 71.

It should be noted that to evaluate output signals from the sensor phases in terms of current values, areas of the sensor phases are widened so that mechanical distortions can be efficiently converted into electric charges. Thus, when a disturbance or the like is to be detected, using the driving apparatus shown in FIG. 7 can increase the sensitivity with which the disturbance or the like is detected since all the pattern electrodes 3 of the piezoelectric element 2 are used as the sensor phases.

Third Embodiment

Next, a description will be given of an example of a driving apparatus according to a third embodiment of the present invention.

Figure 8:
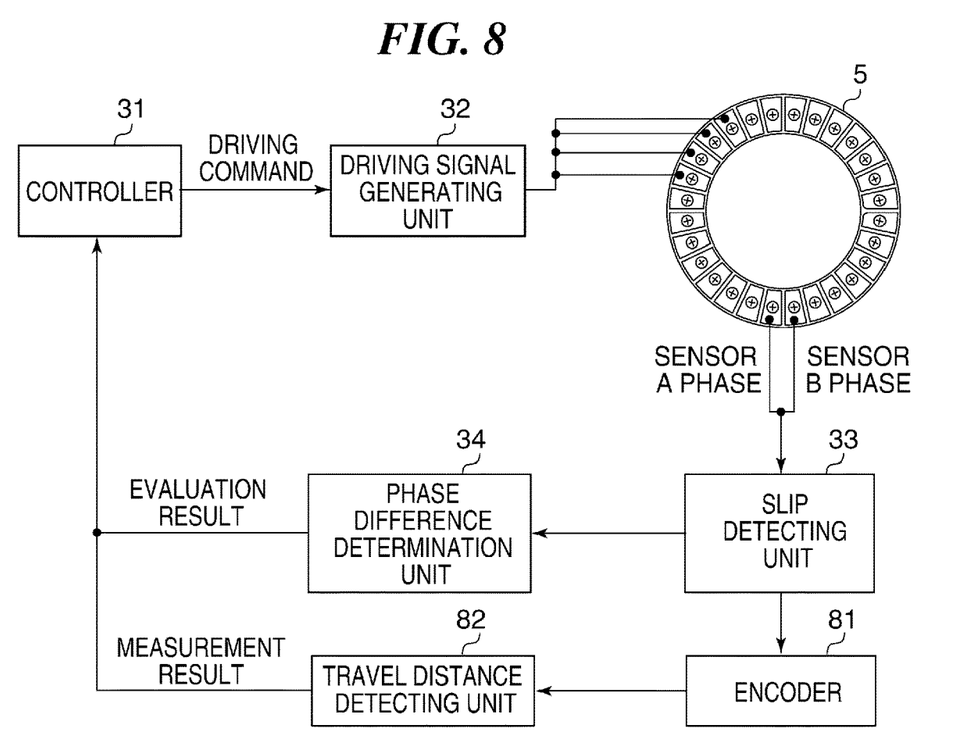
FIG. 8 is a diagram useful in explaining an example of a driving apparatus according to a third embodiment of the present invention.

FIG. 8 is a view useful in explaining the example of the driving apparatus according to the third embodiment of the present invention. It should be noted that in FIG. 8, the same component element as those appearing in FIG. 3 are denoted by the same reference numerals. For the driving apparatus shown in FIG. 8 as well, wear of the frictional contact surface which would occur due to a disturbance or the like is reduced as with the driving apparatus shown in FIG. 3.

The driving apparatus shown in the figure has an encoder 81 and a travel distance detecting unit 82. The encoder 81 is a displacement sensor that outputs an amount of mechanical displacement, which is caused by rotation of the driven body 10 driven by the vibration-wave motor, as a displacement signal. When the slip detecting unit 33 detects a slip caused by a disturbance, the slip detecting unit 33 sends an operating command to the encoder 81. In response to the operating command, the encoder 81 outputs a displacement signal. The travel distance detecting unit 82 obtains an amount of rotation (that is, a driving amount) of the driven body 10 based on the displacement signal and sends the amount of rotation as a measurement result to the controller 31.

In a standby state where the vibration-wave motor is at a standstill, the encoder 81 is not energized, and upon receiving an operating command from the slip detecting unit 33, the encoder 81 starts operating. It should be noted that the encoder 81 may operate even in the standby state.

Based on the rotational direction (evaluation result) received from the phase difference determination unit 34 and the amount of rotation (measurement result) received from the travel distance detecting unit 82, the controller 31 calculates an initial position of the vibration-wave motor before occurrence of a disturbance. The controller 31 then sends a driving command, which is for bringing the vibration-wave motor back to the initial position, to the driving signal generating unit 32. The driving signal generating unit 32 sends a driving signal corresponding to the driving command to the vibrating body 5 (the vibration-wave motor) and brings the rotational position of the vibration-wave motor back to the initial position.

The vibration-wave motor can be similarly brought back to the initial position as long as the rotational position of the vibration-wave motor is detected by sensing all the time using an absolute encoder. On the other hand, an incremental encoder can be used for the driving apparatus shown in the figure, and as a result, costs can be reduced. In addition, sensing with an encoder is not performed all the time, and hence standby power is reduced when the vibration-wave motor is stopped.

As described above, the third embodiment of the present invention obtains the effect of bringing the rotational position of the vibration-wave motor back to the initial position by a simple construction as well as the effects obtained in the first embodiment described above. It should be noted that in the third embodiment of the present invention, the encoder 81 detects a displacement of the driven body 10 since the driven body 10 is moving, but when the vibrating body 5, not the driven body 10, is moving, the encoder 81 should detect a displacement of the vibrating body 5 and provide the same driving control as described above.

Fourth Embodiment

Next, a description will be given of an example of an image pickup apparatus according to a fourth embodiment of the present invention. In the present embodiment, a vibration-wave motor apparatus having the driving apparatus according to any of the first to third embodiments described above and a vibration-wave motor is used as a motor apparatus for panning and tilting in the image pickup apparatus. The image pickup apparatus may be used as a surveillance camera, a network camera, or the like.

Figure 9:
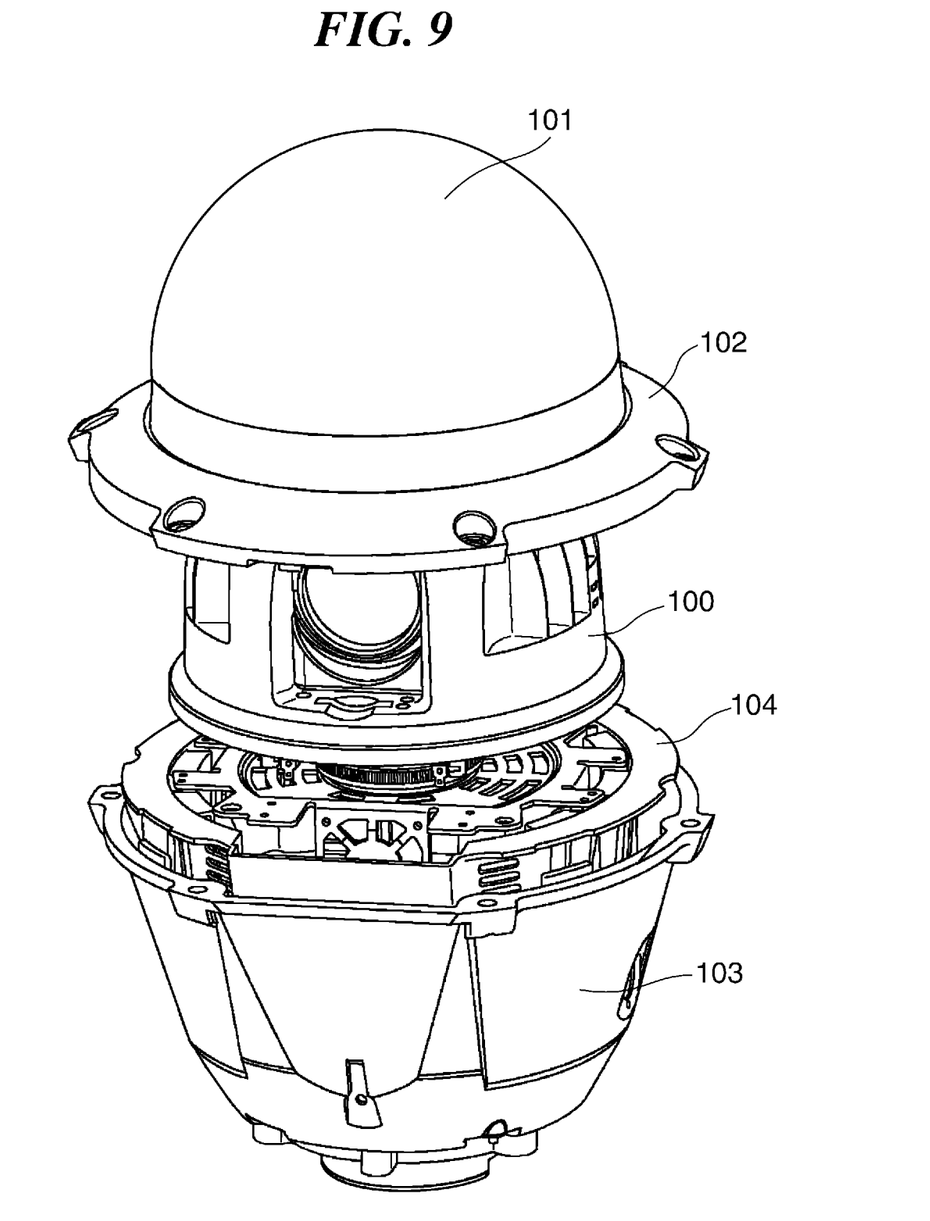
FIG. 9 is a view schematically showing an overall arrangement of an image pickup apparatus according to a fourth embodiment of the present embodiment.

FIG. 9 is a view schematically showing the overall arrangement of the image pickup apparatus 100 according to the present embodiment. A dome component 101 is mounted integrally on a cover 102, and the dome component 101 and the cover 102 are configured as an integral unit constituting a dome cover. The cover 102 is mounted on a case 103 to cover the image pickup apparatus 100. An inner case 104 is mounted inside the case 103.

Figure 10:
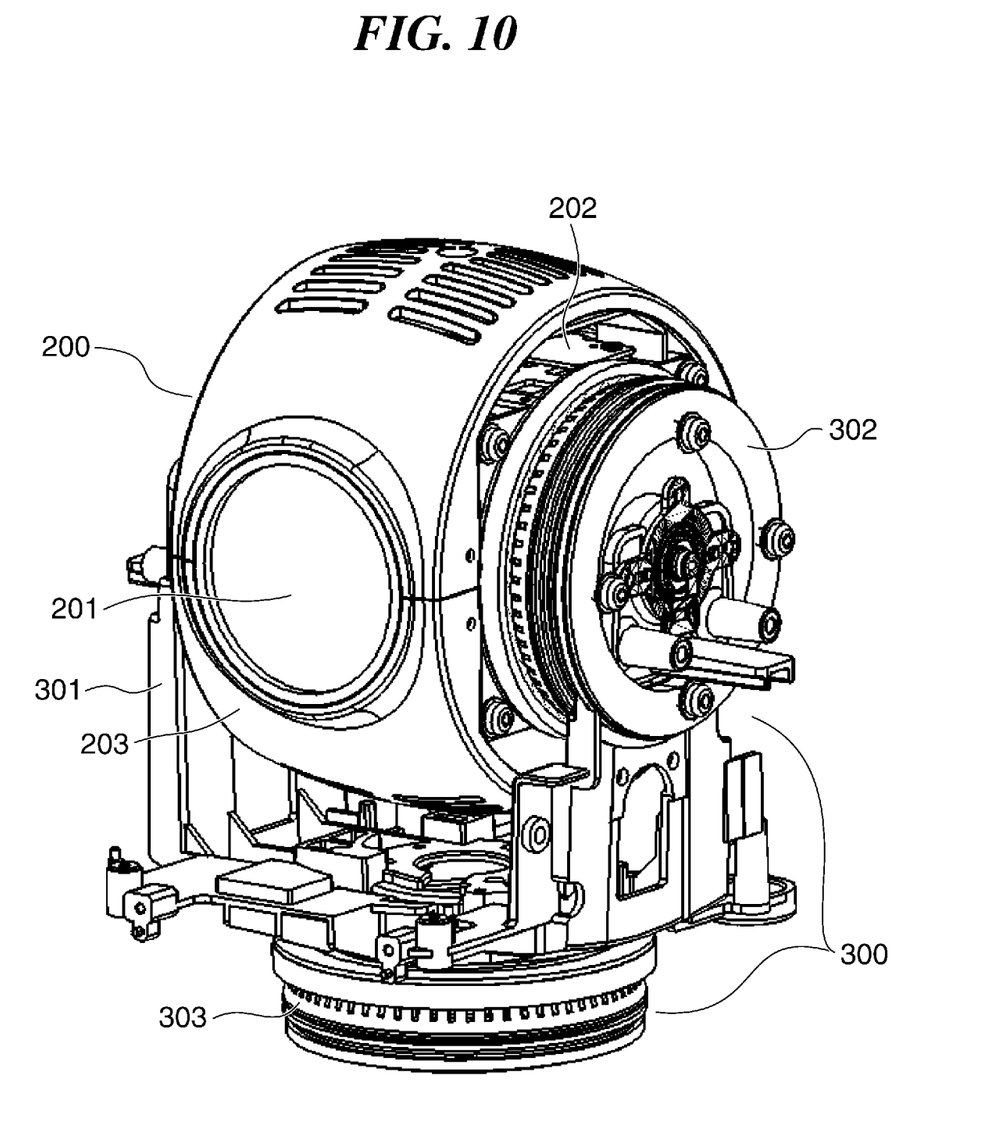
FIG. 10 is a view schematically showing an internal arrangement of the image pickup apparatus in FIG. 9.

FIG. 10 is a view schematically showing an internal arrangement of the image pickup apparatus 100. The image pickup apparatus 100 is comprised mainly of a camera unit 200 and a rotary base unit 300.

The camera unit 200 is constructed as described hereafter. A lens unit 201 which has an optical system such as a lens and an image pickup device such as a CCD or a CMOS is supported by a lens frame unit 202 which has a tilt rotary shaft. A camera cover 203 for covering the lens unit 201 is mounted on the lens frame unit 202. A vibration-wave motor apparatus 302, to be described later, for rotatively driving the camera unit 200 in a tilting direction is fixed to the lens frame unit 202.

The rotary base unit 300 is constructed as described hereafter. A rotary base 301 rotatably supports the camera unit 200 in the tilting direction. The vibration-wave motor apparatus 302 is able to directly and rotatively drive the camera unit 200 in the tilting direction by driving the tilt pulley 204. It should be noted that the vibration-wave motor apparatus 302 has the driving apparatus according to any of the first to third embodiments described above and a vibration-wave motor. A control substrate, not shown, is fixed to the rotary base 301.

A vibration-wave motor apparatus 303 for rotatively driving the rotary base 301 in a panning direction is mounted on the rotary base 301. The vibration-wave motor apparatus 303 is able to directly and rotatively drive the rotary base 301 in the panning direction. The driving apparatus according to any of the first to third embodiments described above and a vibration-wave motor may be used for the vibration-wave motor apparatus 303 as well. The vibration-wave motor apparatus 303 is fixed to a fixing sheet metal, not shown, which has a panning shaft bearing unit. The fixing sheet metal is placed in the inner case 104 shown in FIG. 9.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-253179, filed Dec. 27, 2016 and Japanese Patent Application No. 2017-234460, filed Dec. 6, 2017, which are hereby incorporated by reference herein in their entirety.

What is claimed is:

1. A driving apparatus for driving a vibration-wave motor comprising a vibrating body including an electro-mechanical energy conversion device and a driven body pressed against the vibrating body and configured to move the driven body relatively to each other, wherein the electro-mechanical energy conversion device comprises driving electrodes that receive driving signals, and sensor electrodes that output detecting signals corresponding to vibrations of the vibrating body, the driving apparatus comprising:

a determination unit configured to determine, based on the detecting signals, a direction in which the vibrating body and the driven body are to be moved relatively to each other; and a control unit configured to control the vibration-wave motor based on the driving signals, which correspond to a result of determination by the determination unit, wherein the determination unit determines slip direction when a slip occurs between the vibrating body and the driven body, in a state where the vibration-wave motor is at a standstill, and wherein the control unit is configured to control the vibration-wave motor so that the driven body is driven in the same direction as the slip direction to reduce the slip of the vibration-wave motor, in the state where a slip occurs between the vibrating body and the driven body.

2. The driving apparatus according to claim 1, wherein:

the sensor electrodes comprise a first sensor electrode that outputs a first detecting signal and a second sensor electrode that outputs a second detecting signal, the detecting signals including the first and second detecting signals, and based on a phase difference between the first detecting signal output from the first sensor electrode and the second detecting signal output from the second sensor electrode, the determination unit determines the direction.

3. The driving apparatus according to claim 1, wherein the sensor electrodes double as the driving electrodes to which the driving signals are input.

4. The driving apparatus according to claim 3, wherein the sensor electrodes are used as the sensor electrodes in the state where the vibration-wave motor is at the standstill.

5. The driving apparatus according to claim 3, further comprising a selector configured to switch the sensor electrodes to the driving electrodes.

6. The driving apparatus according to claim 1, further comprising:

a travel distance detecting unit configured to detect a travel distance of the vibrating body or the driven body, wherein the control unit controls the vibration-wave motor based on the driving signals, which correspond to the result of determination by the determination unit and a result of detection by the travel distance detecting unit.

7. The driving apparatus according to claim 1, further comprising:

a displacement sensor configured to detect displacement of the vibrating body or the driven body; and a slip detecting unit configured to cause the displacement sensor to detect the displacement, in a state where a slip occurs between the vibrating body and the driven body, while in the state where the vibration-wave motor is at the standstill.

8. A driving method of driving a vibration-wave motor comprising a vibrating body including an electro-mechanical energy conversion device and a driven body pressed against the vibrating body and configured to move the driven body relatively to each other, wherein the electro-mechanical energy conversion device comprises driving electrodes that receive driving signal, and sensor electrodes that output detecting signals corresponding to vibrations of the vibrating body, the driving method comprising:

determining, based on the detecting signals, a direction in which the vibrating body and the driven body are to be moved relatively to each other;

controlling the vibration-wave motor based on the driving signals, which correspond to a result of determination by the determining;

determining a slip direction, in a state where a slip occurs between the vibrating body and the driven body, while in a state where the vibration-wave motor is at a standstill; and controlling the vibration-wave motor so that the driven body is driven in the same direction as the slip direction to reduce the slip of the vibration-wave motor, in the state where the slip occurs between the vibrating body and the driven body.

9. A vibration-wave motor apparatus comprising:

a vibration-wave motor comprising:

a vibrating body including an electro-mechanical energy conversion device; and a driven body pressed against the vibrating body and configured to move the driven body relatively to each other, wherein the electro-mechanical energy conversion device comprises driving electrodes that receive driving signals, and sensor electrodes that output detecting signals corresponding to vibrations of the vibrating body; and a driving apparatus that drives the vibration-wave motor, and comprising:

a determination unit configured to determine, based on the detecting signals, a direction in which the vibrating body and the driven body are to be moved relatively to each other; and a control unit configured to control the vibration-wave motor based on the driving signals, which correspond to a result of determination by the determination unit, wherein the determination unit determines a slip direction, in a state where a slip occurs between the vibrating body and the driven body, while in a state where the vibration-wave motor is at a standstill, and wherein the control unit is configured to control the vibration-wave motor so that the driven body is driven in the same direction as the slip direction to reduce the slip of the vibration-wave motor, in the state where the slip occurs between the vibrating body and the driven body.

10. An image pickup apparatus comprising:

a lens; and the vibration-wave motor apparatus according to claim 9.

* * * * *